Figure 6B:
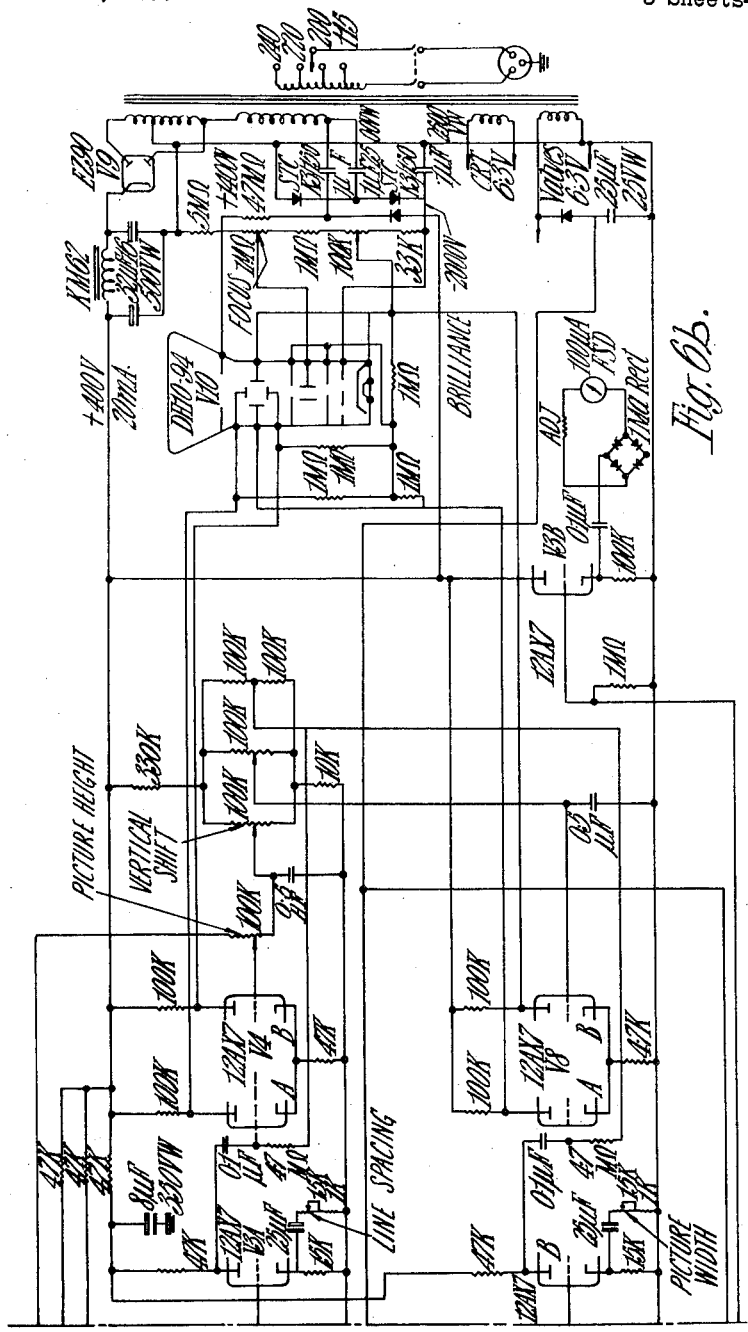

May 22, 1962 R. B. HALE 3,035,438
TEST APPARATUS FOR INTERNAL COMBUSTION ENGINES
Filed Oct. 27, 1958
3 Sheets-Sheet 1
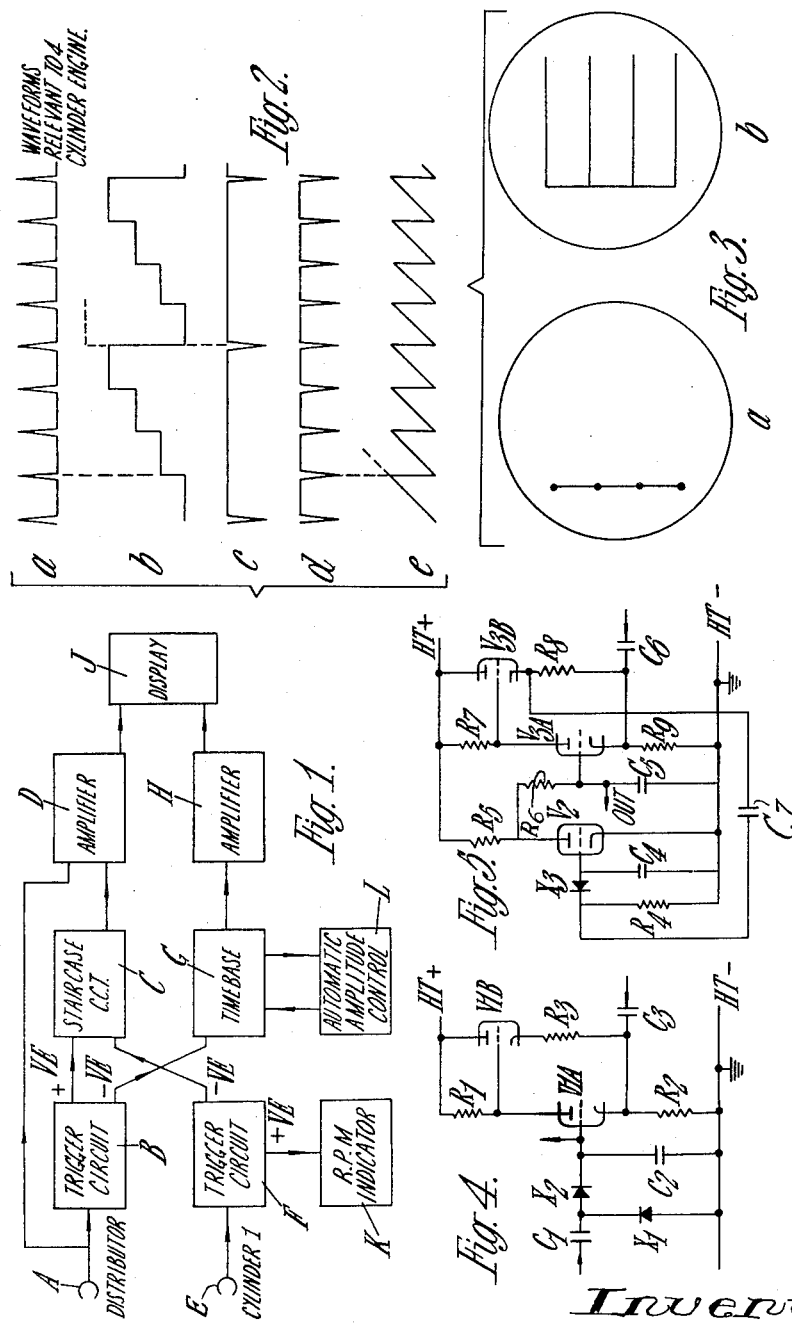
Inventor
R. B. Hale
By Mascot Downing Seebold
Attys.

May 22, 1962

R. B. HALE 3,035,438

TEST APPARATUS FOR INTERNAL COMBUSTION ENGINES

Filed Oct. 27, 1958

3 Sheets-Sheet 2

Inventor
R. B. Hale
By Glascock Downing Reebel
Attys.

Inventor
R. B. Hale

United States Patent Office 3,035,438
Patented May 22, 1962

3,035,438
TEST APPARATUS FOR INTERNAL COMBUSTION ENGINES
Rodney Barker Hale, Radlett, England, assignor to B.P.L. (Instruments) Limited, Radlett, England
Filed Oct. 27, 1958, Ser. No. 769,719
Claims priority, application Great Britain Feb. 7, 1958
4 Claims. (Cl. 73—116)

This invention relates to test apparatus for internal combustion engines of the kind in which the information required is displayed upon the screen of a cathode ray oscilloscope.

It has previously been proposed to provide test apparatus of the kind referred to adapted for simultaneously portraying and separately portraying on the screen of a cathode ray oscilloscope a plurality of conditions existing in a running internal combustion engine including means for producing a vertical sweep signal in synchronism with the cycle of operation of the engine as a whole, means for producing a horizontal sweep signal in synchronism with a selected internal cycle of said engine, the frequency of said horizontal sweep signal differing from the frequency of the vertical sweep signal by a factor equal to the number of internal cycles of the engine per cycle as a whole, and a detector capable of producing an electric impulse on the occurrence of a selected operating event as it occurs successively in the operating cycle of the engine and applying it to the vertical sweep so that corresponding selected events are indicated upon separate traces spaced vertically from one another. In such an apparatus adjustment has to be made by which the said factor is made appropriate to the number of cylinders which the engine under test has, and it is one object of the invention to provide an apparatus of the kind referred to which is automatically adjustable for use with internal combustion engines whatever the number of cylinders they may have.

The invention consists in a test apparatus for internal combustion engines in which a plurality of conditions are displayed simultaneously and separately on the screen of a cathode-ray oscilloscope in which the one sweep signal for the oscilloscope is of the staircase kind, the rises of the steps of which are produced by the sequential firing of the sparking plugs of the engine, while the other sweep signal is produced at a frequency in synchronism with the firing of said sparking plugs.

The invention further consists in test apparatus for internal combustion engines comprising a cathode ray oscilloscope, a first sweep circuit for the x axis of the oscilloscope comprising a first trigger circuit adapted to be operated by currents flowing in the input cable of the distributor of the engine being tested, a second trigger circuit adapted to be operated by currents flowing in the cable from the distributor to one of the sparking plugs of the rail engine, each of the trigger circuits producing output pulses coincident with the flowing of said currents, a circuit for producing a staircase the output voltage of which is caused to rise in steps of substantially equal amplitude by the output signal from the said first trigger circuit and the output voltage of which is caused to fall abruptly to the bottom step by the output signal from the said second trigger circuit whereby the number of steps in the output waveform is equal to the pulse repetition rate at distributor frequency, a second sweep circuit from the y axis of the oscilloscope comprising a time base circuit fed with output signals from the said first trigger circuit, and an amplifier the input signal of which is obtained from the currents flowing in the input cable of the distributor of the engine and the output of which is combined with the sweep currents of the y axis of the oscilloscope.

Figure 6A:
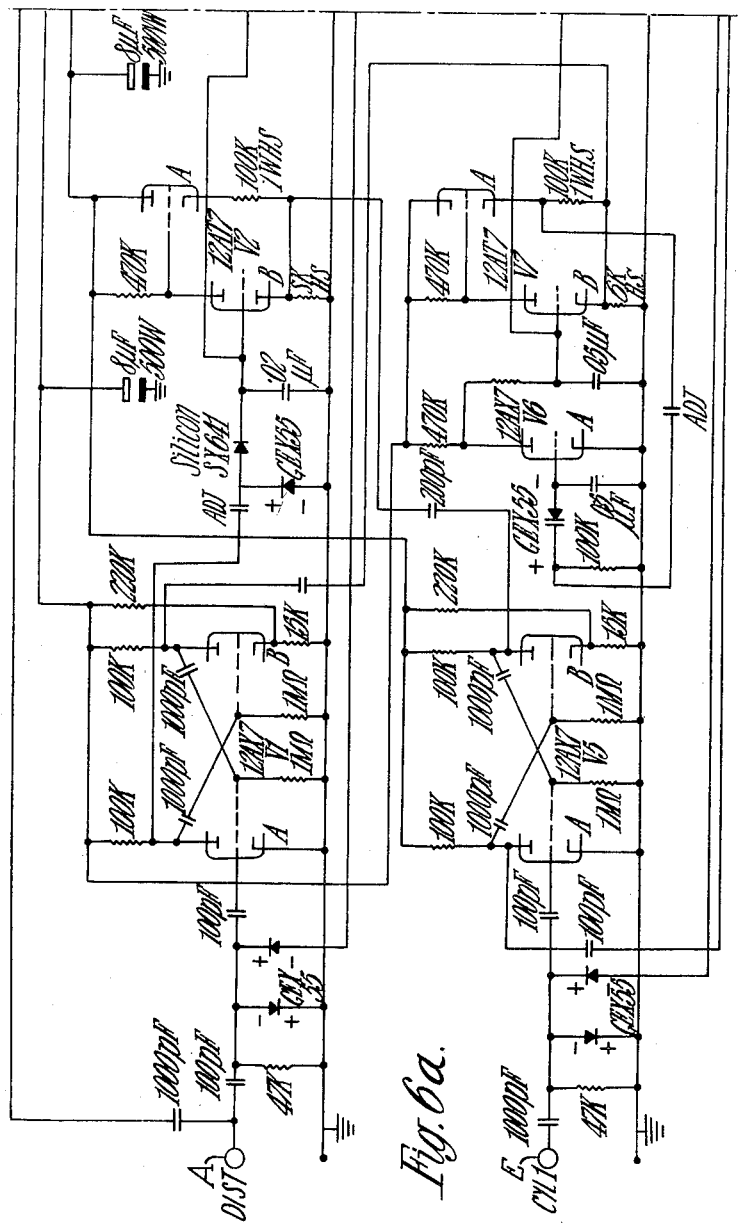

The accompanying drawings show by way of example only one embodiment of the invention in which:

FIGURE 1 is a diagrammatical representation of the circuit arrangement of the apparatus in block form, FIGURES 2a–e show wave forms relevant to a four-cylinder engine, FIGURES 3a and b show staircase sweep alone and combined sweeps respectively, FIGURE 4 is a diagram of a circuit for producing the staircase sweep, FIGURE 5 is a diagram of a circuit for producing the time-base, while FIGURE 6 is a circuit diagram of a complete apparatus, broken into two partial FIGURES 6a and 6b to permit an adequate scale.

Referring to the block diagram of FIGURE 1, there is a clip A which is attached to the insulation of the input cable of the distributor of the engine being tested, which capacitively picks up a signal from the currents flowing in the distributor circuit and which is fed therefrom both into the trigger circuit B and amplifier D, as shown by the arrows. The trigger circuit B produces two output pulses simultaneously, the one positive and the other negative, coincident with the firing of each sparking plug. The two pulses are shown in FIGURES 2a and 2d respectively.

In a similar manner a clip E is attached to the insulation of the cable from the distributor to the plug in cylinder No. 1, which capacitively picks up a signal and feeds it to the trigger circuit F, which, in like manner to the circuit B, produces positive and negative pulses simultaneously coincident with the firing of the plug of cylinder No. 1, the negative ones of which are shown in FIGURE 2c.

Positive pulses at distributor frequency and negative pulses at cylinder No. 1 frequency are fed into a staircase circuit C. The positive pulses cause the output voltage from the staircase circuit to rise in steps of substantially equal amplitude as shown in FIGURE 2b. Each negative pulse causes the output voltage to fall abruptly to its original starting value, and thus the number of steps in the output waveform is equal to the pulse repetition rate at distributor frequency divided by the pulse repetition rate at cylinder No. 1 frequency, i.e. equal to the number of cylinders.

The staircase voltage is fed to an amplifier D, and thence to the Y axis of a cathode ray display tube J. In the absence of any other deflecting voltages on the tube, the display seen is as shown in FIGURE 3a.

The negative pulses at distributor frequency are fed into a time-base circuit G, the output from which is a sawtooth waveform automatically at distributor frequency, as shown in FIGURE 2e. This waveform is amplified by amplifier H and fed to the X axis of the display tube J, with the resulting display as shown in FIGURE 3b.

The waveform picked up by the distributor cable clip A is also fed to the Y axis amplifier D, with the result that the waveform is displayed on the traces of FIGURE 3b, each line containing the waveform due to one of the individual cylinders and displayed in order of cylinder firing.

The positive pulses at cylinder No. 1 frequency may conveniently be used to operate a simple r.p.m. indicator K, since the repetition rate of these pulses is proportional to the engine speed.

The automatic time-base amplitude control L is explained later.

The staircase circuit which is shown in detail in FIGURE 4, has a double triode valve of which valve V1A is normally non-conducting and valve V1B of which is conducting. When valve V1A is non-conducting, the grid of valve V1B is held very positive, being at high tension potential via resistor R1. The cathode current of valve V1B passes through resistor R3 and resistor R2, and the voltage developed across resistor R2 is sufficient to maintain valve V1A in a non-conducting state. Positive trigger pulses at distributor frequency are fed via capacitor C1 and rectifier X2 to capacitor C2. Rectifier X2 is conducting for the positive pulses which charge capacitor C2 positively but is non-conducting for the charge on capacitor C2 in the intervals between pulses. Therefore, capacitor C2 sensibly holds its charge between pulses, and each succeeding pulse increases the charge on capacitor C2 in abrupt steps. Capacitor C2 is larger in value than capacitor C1 and the voltage steps produced in capacitor C2 are much smaller than the amplitude of the pulses applied to capacitor C1.

Upon the occurrence of a negative triggering pulse applied to capacitor C3, obtained from the cylinder No. 1 trigger circuit, the potential across resistor R2 is greatly reduced, causing valve V1A to conduct. This immediately reduces the grid potential of valve V1B, and with a rapid culminative action, reduces the potential across resistor R2 due to the virtual cut-off of the current of valve V1B. The positive voltage on capacitor C2 maintains the grid of valve V1A at a higher potential than that of the cathode of valve V1A. Capacitor C2 thus discharges to a low value by passing grid current in valve V1A. Upon completion of this discharge, valve V1A and valve V1B revert to their normal states. Thus capacitor C2 is discharged.

Considering now the time-base circuit shown in FIGURE 5, valve V3A and valve V3B, together with resistors R7, R8 and R9, perform the same functions as valves V1A, V1B, resistors R1, R2 and R3 in FIGURE 4. Capacitor C5 charges through resistors R5 and R6 from the H.T. line in a substantially linear manner initially. A negative pulse obtained from the distributor trigger circuit and applied through capacitor C6 to resistor R9 initiates the discharging action of valve V3A and valve V3B and capacitor C5 discharges at distributor frequency, giving rise to the waveform of FIGURE 2e. Since the frequency of these discharging pulses varies with engine speed the amplitude of the sawtooth waveform varies also.

Valve V2, with resistors R4, R5, capacitors C4, C7 and rectifier X3 are included to compensate substantially for the variation over a reasonable range of engine speeds. Negative pulses which appear at the cathode of valve V3B upon each discharge of capacitor C5 are fed through capacitor C7 and rectified by rectifier X3 to give a negative charge to capacitor C4. Since capacitor C4 is large, the grid potential of valve V2 varies smoothly with engine speed. Higher engine speeds reduce the anode current of valve V2, hence the anode potential rises and capacitor C5 charges at a higher rate through resistor R6, there being a lesser voltage drop across resistor R5. Thus the amplitude of the sawtooth waveform remains substantially constant with variations of engine speed.

With reference to the complete circuit diagram of FIGURES 6a and 6b valves V1 and V5 are the two trigger circuit valves, valve V2 the staircase voltage discharging valve, valve V7 the time-base discharging valve, valve V6 the automatic amplitude control valve, valve V3A and valve V4 staircase waveform and distributor signal amplifier respectively, valve V8 the time-base amplifier, and valve V3B part of an engine speed indicating circuit.

The signal input from both the distributor and cylinder 1 cable clips are amplitude limited prior to operating the trigger circuits by pairs of diodes connected back-to-back and one of each pair taken to a small negative voltage. This ensures that negative signal pulses of approximately constant amplitude are fed into the particular type of trigger circuit used.

It can be seen from the above description of one embodiment of the invention that the number of steps provided by the staircase sweep depending solely upon the number of individual signals provided by the sparking plugs in one cycle of operation of the engine and that therefore the number of horizontal sweeps shown upon the tube is the number of cylinders of the engine and that no adjustment is required to attain this result.

It should also be clear that the signals derived from the distributor cable clip indicate on the horizontal sweeps a plurality of conditions in the engine corresponding to selected events indicated upon separate traces spaced vertically from one another without the necessity of producing a horizontal sweep signal differing in frequency from the frequency of the vertical sweep signal by a factor equal to the number of cylinders of the engine.

It is to be understood that the foregoing description is by way of example only and that details for carrying the invention into effect may be varied without departing from the scope of the invention.

I claim:

1. Test apparatus for internal combustion engines, comprising a cathode-ray oscilloscope, a first trigger circuit producing discrete pulses of constant amplitude coincident with the application thereto of discrete input signals, a second trigger circuit producing discrete pulses of constant amplitude coincident with the application thereto of discrete input pulses, a staircase wave producing circuit having a first input and a second input respectively connected to said trigger circuits and in which pulses applied to the first input cause the production of an output voltage which rises instantaneously in steps of substantially equal height coincident with the pulses applied to said first input, and in which pulses applied to the second input cause the output voltage to fall abruptly to a predetermined minimum value each and every time a pulse is applied to said second input, a first amplifier receiving the output from the staircase wave producing circuit, amplifying it and applying it to the Y-axis of the cathode-ray oscilloscope to shift the display step by step instantaneously, a time-base circuit connected to and producing a saw-tooth wave-form in synchronism with the output of the first trigger circuit, a second amplifier receiving the output from the time-base circuit and amplifying it and applying it to the X-axis of the cathode-ray oscilloscope, a first connector for coupling the input of the first trigger circuit to the spark voltage producing circuit of an internal combustion engine to receive signals at the frequency of generation of said voltage, a second connector for coupling the input of the second trigger circuit to the spark discharge circuit of an individual cylinder of the same internal combustion engine to receive signals at the frequency of the firing of said cylinder, and a connection between the first connector and the first amplifier whereby the cathode-ray beam of the cathode-ray oscilloscope is deflected along its Y-axis by signals received by way of said first connector.

2. Test apparatus for internal combustion engines, comprising a cathode-ray oscilloscope, a first trigger circuit producing discrete pulses of constant amplitude coincident with the application thereto of discrete input signals, a second trigger circuit producing discrete pulses of constant amplitude coincident with the application thereto of discrete input pulses, a staircase wave producing circuit having a first input and a second input respectively connected to said trigger circuits and in which pulses applied to the first input cause the voltage held by a capacitor to increase step by step instantaneously in steps of substantially equal value coincident with the said pulses applied to the first input, and in which pulses applied to the second input cause the charge held by the said capacitor to be discharged abruptly and fall to a predetermined voltage each and every time a pulse is applied to said second input, a first amplifier receiving the output from the staircase wave producing circuit, amplifying it and applying it to the Y-axis of the cathode-ray oscilloscope to shift the display step by step instantaneously, a time-base circuit connected to and producing a saw-tooth wave-form in synchronism with the output of the first trigger circuit, a second amplifier receiving the output from the time-base circuit and amplifying it and applying it to the X-axis of the cathode-ray oscilloscope, a first connector for coupling the input of the first trigger circuit to the spark voltage producing circuit of an internal combustion engine to receive signals at the frequency of generation of said voltage, a second connector for coupling the input of the second trigger circuit to the spark discharge circuit of an individual cylinder of the same internal combustion engine to receive signals at the frequency of the firing of said cylinder, and a connection between the first connector and the first amplifier whereby the cathode-ray beam of the cathode-ray oscilloscope is deflected along its Y-axis by signals received by way of said first connector.

3. Test apparatus as claimed in claim 1 in which each trigger circuit provides positive and negative pulses simultaneously, the positive pulse of the first trigger circuit being used to operate the said staircase circuit while the negative pulse is used to operate the time base circuit, while the positive pulse of the second trigger circuit is used to operate a revolutions per minute indicator while the negative pulse is used to operate the staircase circuit.

4. Test apparatus as claimed in claim 1 in which an automatic amplitude control is provided for the time base circuit.

References Cited in the file of this patent
UNITED STATES PATENTS

| | | |
|---|---|---|
| 2,604,515 | McNulty | July 22, 1952 |
| 2,608,093 | Traver | Aug. 26, 1952 |
| 2,688,127 | Sargeant et al. | Aug. 31, 1954 |
| 2,867,766 | Broder et al. | Jan. 6, 1959 |